Patented Apr. 22, 1930

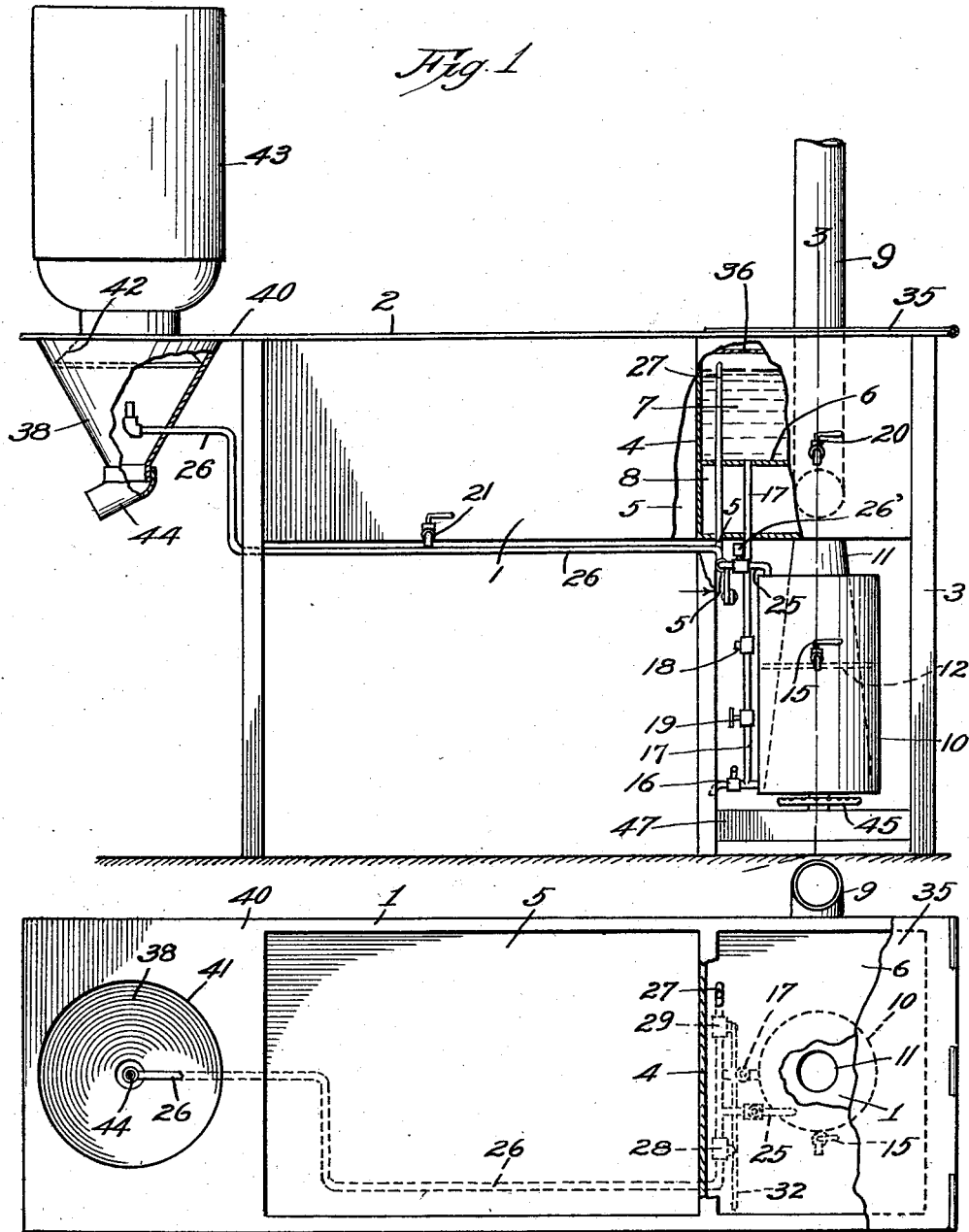

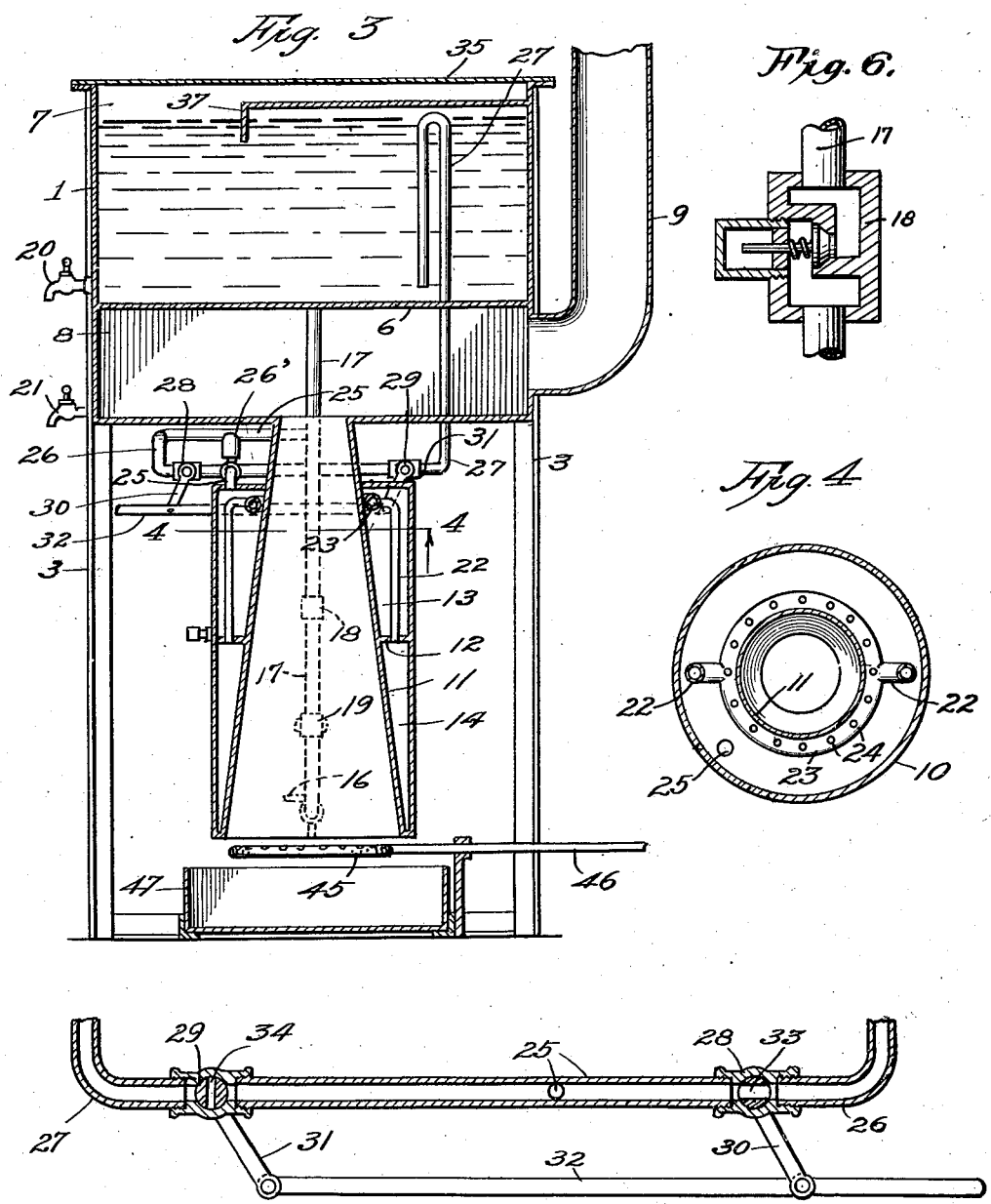

1,755,261

UNITED STATES PATENT OFFICE

HARRY N. LEAVITT, OF SPRINGFIELD, MISSOURI

WATER-HEATING APPARATUS

Application filed March 23, 1925. Serial No. 17,520.

My invention relates to improvements in water heating apparatus.

It is particularly adapted for providing steam for washing out large cream cans at country cream stations.

One of the objects of my invention is to provide an apparatus with which steam can be quickly made to be used to remove the thick cream which adheres to the walls of the cans.

A further object of my invention is to provide an apparatus of the kind described, which is simple, relatively cheap to make, which is durable, not liable to get out of order, sanitary, and with which hot water and steam may be very quickly produced.

Still another object of my invention is the provision of a novel and efficient steam boiler, and novel means by which the steam produced therein may be utilized for preheating a relatively large amount of water, or for steaming cans to effect the dissolving of heavy cream on the inner walls thereof.

The novel features of my invention are hereinafter fully described and claimed.

In the accompanying drawings, which illustrate the preferred embodiment of my invention, Fig. 1 is a side elevation partly broken away of my improved can cleaning apparatus.

Fig. 2 is a top view, partly broken away, of the same.

Fig. 3 is an enlarged vertical sectional view on the line 3—3 of Fig. 1.

Fig. 4 is a cross section on the line 4—4 of Fig. 3.

Fig. 5 is an enlarged vertical sectional view on the line 5—5 of Fig. 1.

Fig. 6 is an enlarged vertical sectional view of the check valve 18, shown in Figs. 1 and 2.

Similar reference characters designate similar parts in the different views.

1 designates a support comprising a casing, which may be rectangular having a table like top 2, and which may be supported on legs 3. A vertical transverse partition 4, in the casing 1, provides at one of its sides a compartment 5 having an open top and adapted to hold water for washing cans. At the other side of the partition 4, and extending horizontally therefrom to an adjacent end wall of the casing, is a partition 6, which forms in the casing an upper compartment 7, comprising a tank adapted to hold water, and a lower compartment 8 adapted to receive gaseous products of combustion for heating the tank 7, and which has an outlet communicating with a pipe 9 for carrying off the fumes and burnt gas, and which may contain the usual damper, not shown.

Below the casing 1, and underneath the compartment 8 is a steam boiler, comprising an outer shell 10 through which vertically extends an upwardly tapering flue 11, the upper end of which is attached to the bottom of the casing 1, and which discharges into the compartment 8.

In the shell 10 is a transverse horizontal partition 12 through which the flue 11 extends, and which divides the shell into an upper chamber 13 and a lower chamber 14. These two compartments may be respectively provided near their lower ends with drain cocks 15 and 16, the latter being attached to a water conductor 17, having its upper end connected to the partition 6 and communicating with the tank compartment 7. The lower end of the conductor connects to the shell 10 and communicates with the chamber 14 near the bottom of the latter.

In the conductor 17 is a check valve 18 which opens downwardly toward the chamber 14, and which prevents back flow from the latter to the tank compartment 7. In the conductor 17, is also a shut off valve 19.

In the side of the casing 1 and communicating with the compartment 7 near the bottom of the latter is a drain cock 20.

One side of the casing 1, is also provided with a drain cock 21, which communicates with the compartment 5 near the bottom of the latter.

Connected to and extending through the partition 12 are two vertical pipes 22, the upper ends of which connect with and discharge into a ring pipe 23, at opposite sides respectively of the flue 11. In the upper side of the ring pipe 23, which encircles the flue 11, are provided holes 24.

A steam conductor 25 having in it a safety valve 26', is connected to the top of the shell 10 and communicates with the compartment 13. Said steam conductor 25 has two branches 26 and 27 in which are respectively located two controlling valves 28 and 29, having respectively swinging arms 30 and 31, to which are pivoted a horizontal operating member comprising a horizontal bar 32. The valves 28 and 29 are respectively provided with transverse ports 33 and 34 disposed at right angles to each other, so that when the bar 32 is reciprocated, the valves will be alternately opened and closed.

When the valve 28 is open, the valve 29 will be closed, and vice versa.

The branch 27 extends through the bottom of the casing 1 and through the bottom of the tank compartment 7, and has in said compartment a return bend, whereby the branch will discharge steam downwardly adjacent to the bottom of the compartment 7. The latter has normally covering its open top a hinged lid 35. In the compartment 7 and over the branch 27, is a horizontal baffle plate 36 having a downwardly extending lip 37, the function of said plate being to prevent the water in the tank 7 boiling over from the pressure of steam escaping from the branch 27.

The branch 26 passes under the casing 1 near to and below the compartment 5, thereby serving to heat the latter. The branch 26 extends through the converging wall of a funnel shaped receptacle 38, the upper large end of which is fastened to the underside of a horizontal apron 40, which is a projecting part of the top 2, and which has a vertical hole 41, through which may be inserted the mouth and neck 42 of a large cream can 43, such as is used to hold milk or cream. By having the walls of the receptacle 38 downwardly converging it is adapted to support in inverted positions cream cans having mouths of different diameters.

The discharge end of the branch 26 extends upwardly so as to discharge directly into the mouth of a cream can supported on the receptacle 38. The latter at its lower end has an outlet which discharges into an elbow spout 44, which is swiveled to swing in a horizontal plane, so as to discharge into either of two receiving cans, not shown, but which may be placed side by side under the spout.

Below and discharging into the flue 11 is a gas or oil burner 45, having a pipe 46 connected to a supply tank, not shown. A drip can 47 may be provided under the burner 45.

In the operation of the invention, the burner 45 is lighted, and the valve 19 is opened, thus permitting water to pass from the compartment 7 through the water conductor 17 into the compartment 14. The flame from the burner will heat the flue 11 and the products of combustion passing into the compartment 8 and out the pipe 9 will heat the water in the boiler and in the tank compartment 7. The bar 32 is moved to close the valve 28 and open the valve 29, thus permitting steam, when formed to pass with water into the compartment 13 through the pipes 22 and ring pipe 23. The steam will pass into the pipe 25, and thence into and through the branch 29, and will be discharged into the tank compartment 7, thereby heating the water in the latter to near the boiling point. The water discharged with the steam from the ring pipe holes 24 will be further heated by striking the flue 11 in the chamber 13.

When the water in chamber 13 has been converted to steam, the bar 32 is moved to the position shown in Figs. 3 and 5, thereby closing valve 29 and opening valve 28, thus permitting steam to pass through the branch 26 into the can supporting receptacle 38. If now a cream can, which has been emptied is inverted and placed with the mouth end resting on the converging walls of the receptacle 38, the steam will be discharged from the branch 26 directly into the can 43 through the mouth thereof, thus dissolving the thick cream which has stuck to the insides of the can. The small amount of water which has been condensed from the steam, mixed with the dissolved cream, will flow out of the can 43 into the receptacle 38, and through the spout 44 into a container, not shown, set to catch the dissolved cream. When most of the cream is thus removed from the can, the latter may be removed and washed in the compartment 5. The spout 44 may be swung so as not to discharge water from the branch 26 into the container which holds the dissolved cream. Another cream can may now be placed inverted in the receptacle, the spout restored to its original position, and the operation then repeated.

As long as the tank 7 holds water, the operation may be kept up, and fresh water may be added to the tank 7 from time to time, the bar 32 being moved to a position in which the valve 29 will be open and the valve 28 closed, when it is required to heat the water in the tank 7, providing the heat from the flue 11 is insufficient to retain the water in the tank sufficiently heated to effect quick conversion into steam of the water in the boiler, as may occur in cold weather.

I do not limit my invention to the structure shown and described, such modifications, as fall within the scope of the appended claims, may be made without departing from the spirit of my invention.

What I claim is:—

1. In a water heating apparatus, a boiler having a flue, a chamber into which said flue discharges having an outlet, a tank above the boiler and above said chamber, a water conductor connecting the tank and boiler for supplying water by gravity from the tank to the boiler, and having a check valve which opens toward the boiler arranged to conduct water by gravity from said tank to said boiler, a steam conductor connected to the boiler and having two branches, one of which discharges into said tank, the other branch opening to the atmosphere and serving as a means for drawing steam from the boiler for external use, and means for shunting the steam in the steam conductor from one to the other of said branches.

2. In a water heating apparatus, a boiler comprising a central flue, two chambers one above the other encircling said flue, a pipe in the upper chamber encircling said flue having discharge perforations, and a water conductor connecting said pipe with said lower one of said chambers, a water tank, a steam conductor connecting with said upper chamber and discharging into said tank, and a water conductor connecting said tank and said lower chamber and having therein a check valve which opens toward said lower chamber.

In testimony whereof I have signed my name to this specification.

HARRY N. LEAVITT.